(12) United States Patent
Barrow

(10) Patent No.: US 7,895,466 B2
(45) Date of Patent: Feb. 22, 2011

(54) DMA ASSISTED DATA BACKUP AND RESTORE

(75) Inventor: David Barrow, Durham, NC (US)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 294 days.

(21) Appl. No.: 12/202,963

(22) Filed: Sep. 2, 2008

(65) Prior Publication Data

US 2010/0057950 A1    Mar. 4, 2010

(51) Int. Cl.
*G06F 11/00* (2006.01)
(52) U.S. Cl. ............... 714/5; 714/14; 714/22; 713/324; 711/162
(58) Field of Classification Search .......... 714/5, 714/14, 22; 713/324; 711/162
See application file for complete search history.

(56) References Cited

U.S. PATENT DOCUMENTS 6,029,249 A * 2/2000 Atkinson ............... 713/323
7,305,502 B2 * 12/2007 Kadatch et al. ............ 710/68
2004/0037156 A1 2/2004 Yoneda et al.
2006/0020765 A1 1/2006 Mahrla et al.
2008/0148083 A1 * 6/2008 Pesavento et al. ........... 713/322

OTHER PUBLICATIONS

Shi, Kaijian, "Dual threshold voltages and power-gating design flows offer good results" Feb. 2, 2006 EDN pp. 65-70.

* cited by examiner

*Primary Examiner*—Robert Beausoliel
*Assistant Examiner*—Charles Ehne

(57) ABSTRACT

An integrated circuit includes a DMA controller for performing conventional DMA transfers and for backing-up and restoring data during low power events. The integrated circuit includes one or more processor components, one or more peripheral components, a power management circuit and the DMA controller. The power management circuit manages power control within the integrated circuit. The DMA controller includes a DMA engine for executing DMA transfers between different ones of the components and memory based on configuration parameters provided to the DMA engine. A detection circuit configured determines if the power management circuit initiates a power state change. The DMA controller also has circuitry for providing a first set of configuration parameters to the DMA engine if no change in power state is detected and overriding the first set of configuration parameters with a second set of configuration parameters if a change in power state is detected.

14 Claims, 8 Drawing Sheets

DMA ASSISTED DATA BACKUP AND RESTORE

TECHNICAL FIELD

The present invention generally relates to maintaining data integrity in an integrated circuit, and more particularly relates to using a DMA controller to backup and restore data when the integrated circuit enters and exits different power states.

BACKGROUND

Complex integrated circuits such as ASICs (Application-Specific Integrated Circuit), SOCs (System-on-Chip) and other designs include various components for performing different functions. These functions, taken together, enable a complex integrated circuit to perform one or more high-level tasks. For example, one or more processor components typically manage overall system operation while lower-level tasks are off-loaded to peripheral components such as I/O (input/output) controllers, graphics accelerators, network controllers, memory controllers, etc. The components within an integrated circuit are interconnected via one or more internal busses that enable data movement between the components and memory. A DMA (direct memory access) controller is also typically included for managing the movement of data. The DMA controller reduces the amount of processor intervention needed to manage low-level data operations such as reads, writes, register transfers, etc.

The components included in an integrated circuit store data pertinent to the overall operation of the integrated circuit. Data may be stored in registers, caches, embedded memory or other volatile storage devices. The entire integrated circuit or certain components of the integrated circuit may be powered down from time-to-time to reduce power consumption by lowering the power operating voltage supplied to the affected components. When a component is powered down, data stored by the component can be lost or corrupted unless properly stored. Data can be saved in redundant retention cells such as flip-flops that remain powered during low power operation. During normal operation, combinatorial circuitry included in the component is connected to a regular power supply that is active only during normal operation. The retention cells are coupled to a second supply that remains continually powered. During low power operation, the combinatorial circuitry is powered off and only the retention cells remain powered. The retention cells can be activated and deactivated relatively quickly, but still consume power when active. Moreover, additional silicon area is needed for the retention cells which are redundant and the cells must be carefully placed and verified to ensure proper integrated circuit operation.

Data can also be saved by transferring the data from the component to be powered down to an external memory. However, additional power is consumed moving the data. Processor involvement is also needed to manage the data backup and restore process. This in turn diverts processor resources from other tasks, prolongs when the processor can be safely powered down and hastens when the processor must be powered back up to manage the data restore process when exiting a low power state. Otherwise, a loss of function, battery operating time or both will occur.

SUMMARY

According to the methods and apparatus taught herein, an integrated circuit includes a DMA controller. The DMA controller manages conventional data transfers when the integrated circuit is configured in a regular power operating state and also data backups and restores when the integrated circuit enters and exits a low power state. This enables one or more components included in the integrated circuit to power down without causing data loss or corruption. This also reduces or eliminates the amount of processor resources needed to protect data if a low-power event occurs, freeing processor resources for other tasks and enabling the processor to power down more quickly. In addition, the integrated circuit may have multiple power domains so that some components can be powered down to a low-power state while other components remain fully powered. A power manager can be provided for managing the operating voltage supplied to the different power domains and for notifying the DMA controller if a low-power event occurs.

In one embodiment, the integrated circuit includes one or more processor components, one or more peripheral components, a power management circuit and the DMA controller. The power management circuit manages power control within the integrated circuit. The DMA controller includes a DMA engine for executing DMA transfers between different ones of the components and memory based on configuration parameters provided to the DMA engine. A detection circuit determines if the power management circuit initiates a power state change. The DMA controller also has circuitry for providing a first set of configuration parameters to the DMA engine if no change in power state is detected and overriding the first set of configuration parameters with a second set of configuration parameters if a change in power state is detected.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
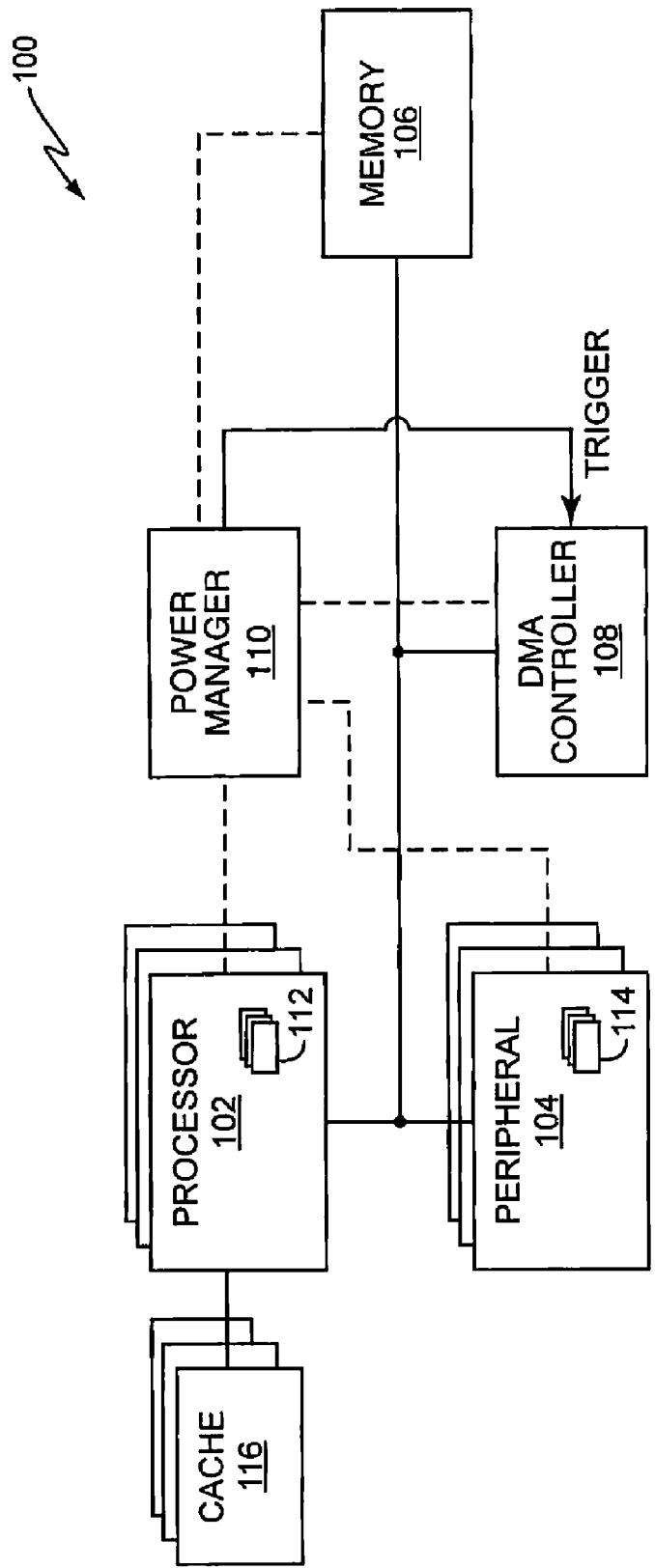
FIG. 1 is a block diagram of an embodiment of an integrated circuit including a DMA controller.

FIG. 1 illustrates an embodiment of an integrated circuit 100 including various components for implementing one or more functions supported by the integrated circuit 100. The integrated circuit 100 can be an ASIC, SOC or other type of design where the components are manufactured in the surface of a semiconductor substrate, coupled to a substrate or circuit board or some combination thereof. The integrated circuit 100 includes at least one processor component 102 for managing overall system operation and one or more peripheral components 104 for handling lower-level tasks such as I/O control, graphics acceleration, network bus and protocol control, memory control, etc. The processor and peripheral components 102, 104 transfer data between each other and memory 106 during normal operation to carry out particular tasks. The memory 106 can be internal to the integrated circuit 100 or external. The memory 106 can be volatile (e.g., SRAM or DRAM) or nonvolatile (e.g., FLASH). In each case, the integrated circuit 100 also includes a DMA controller 108 for managing data movement between the different components 102, 104 and memory 106, freeing processor resources for higher-level tasks.

A power manager circuit 110 is also included in the integrated circuit 100. One or more of the components can be placed into a low power state under control of the power manager 110 as indicated by the dashed lines in FIG. 1. The power manager may receive an external command indicating if a component or components are to be placed in a low-power state. Alternatively, the power command may originate from one of the internal components 102, 104, e.g., a processor 102. In response, the affected components are powered down by the power manager 110. A component can be powered down by reducing or eliminating the operating voltage applied to the component. The power is subsequently restored when the low-power event subsides. The power manager 110 can manage low-power events as a stand-alone component or as an integrated part of one of the other components, e.g., one of the processor components 102.

The DMA controller 108 is notified if a low-power event occurs. In one embodiment, the DMA controller 108 receives a signal (TRIGGER) indicating the occurrence of a low-power event such as a power-down or power-up event. The trigger signal may originate from the power manager 110 as shown in FIG. 1 or from another component, e.g., one of the processors 102. In response to the trigger signal, the DMA controller 108 independently backs-up data or restores data depending on the type of low-power event so that data stored in the affected components is not lost or otherwise corrupted if placed in a low-power state. This way, the other components of the integrated circuit 100, particularly the processor components 102, are free to perform other tasks if a low-power event occurs. This allows the other components to power down more quickly, particularly the processor components 102 which would otherwise conventionally manage the data backup and restore processes.

In one embodiment, the trigger signal provided to the DMA controller 108 indicates if one or more of the components are to be placed in a low-power state. In response, the DMA controller 108 overrides any regularly scheduled DMA transfers with configuration parameters that cause the DMA controller 108 to backup data stored in the affected components to the memory 106. The memory 106 can be located externally or internally to the integrated circuit 100. When located within the integrated circuit 100, the memory 106 can be volatile if it remains powered on during the low-power event. Otherwise, the memory 106 is nonvolatile to prevent data loss or corruption. In each case, the data is transferred from the affected components to a location in the memory 106 for reliable storage during the low-power event. For example, data can be transferred from registers 112, 114 included in the affected components to the memory 106. Data can also be transferred from one or more caches 116 used by the processor components 102. When the low-power event subsides, the trigger signal indicates that the backed-up data can be reliably restored. In response, the DMA controller 108 transfers the data from the memory 106 back to the affected components. This way, data can be safely and reliably stored during low-power events with little or no processor intervention.

Figure 2:
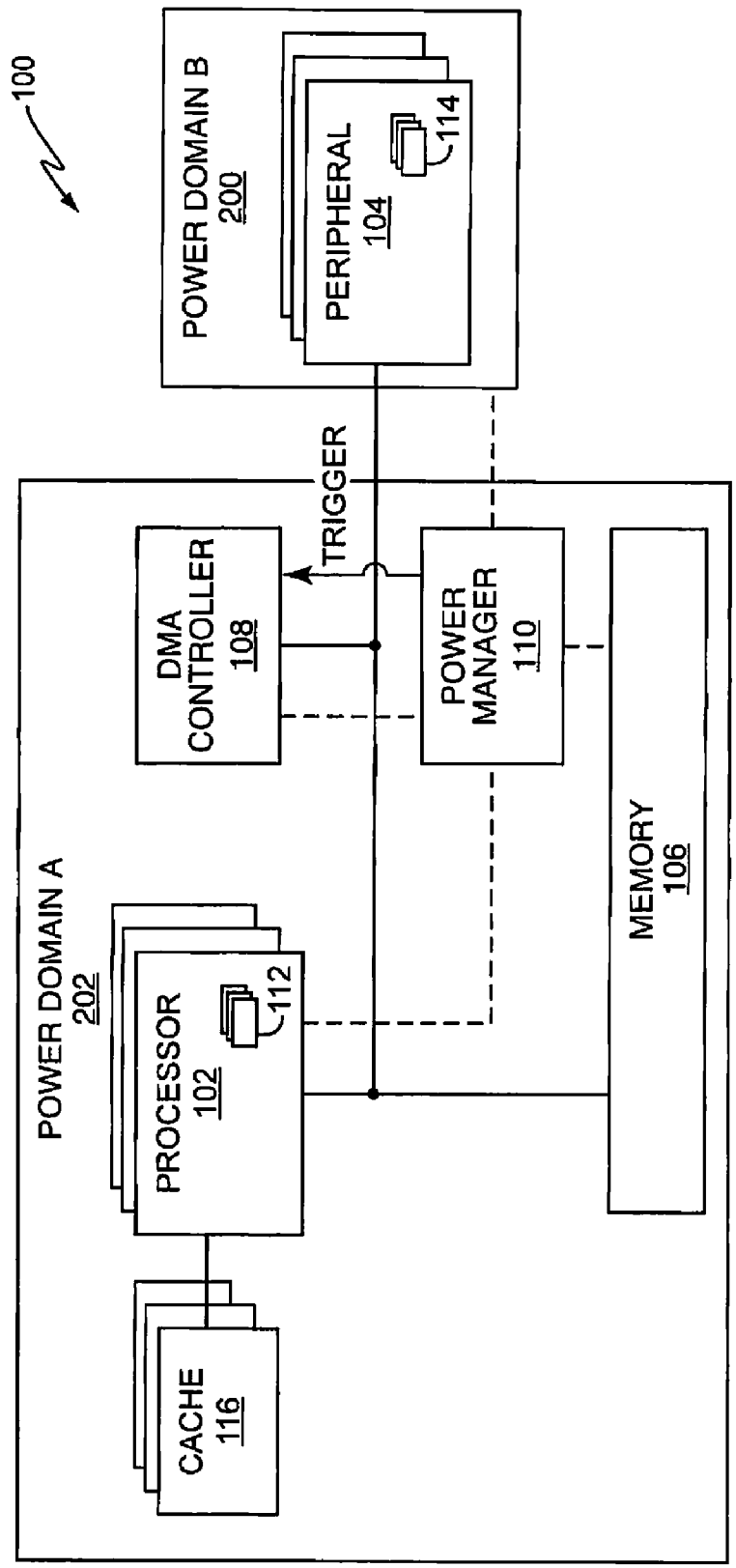
FIG. 2 is a block diagram of another embodiment of an integrated circuit including a DMA controller.

FIG. 2 illustrates another embodiment of the integrated circuit 100. According to this embodiment, the integrated circuit 100 includes two different power domains 200, 202 each having independently controllable power supplies. The peripheral components 104 are located in the first power domain 200 while the remaining components, including the DMA controller 108 and memory 106, are located in the second power domain 202. The power manager 110 places the peripheral components 104 in a low-power state by reducing or eliminating the operating voltage supplied to the first domain 200 while leaving the operating voltage applied to the second domain 202 at a normal operating level. This way, the peripheral components 104 can be powered down while the other components remain fully functional. The DMA controller 108 backs up data stored in the peripheral components 104 during low power events by writing the data to the memory 106 which also remains fully powered.

Figure 3:
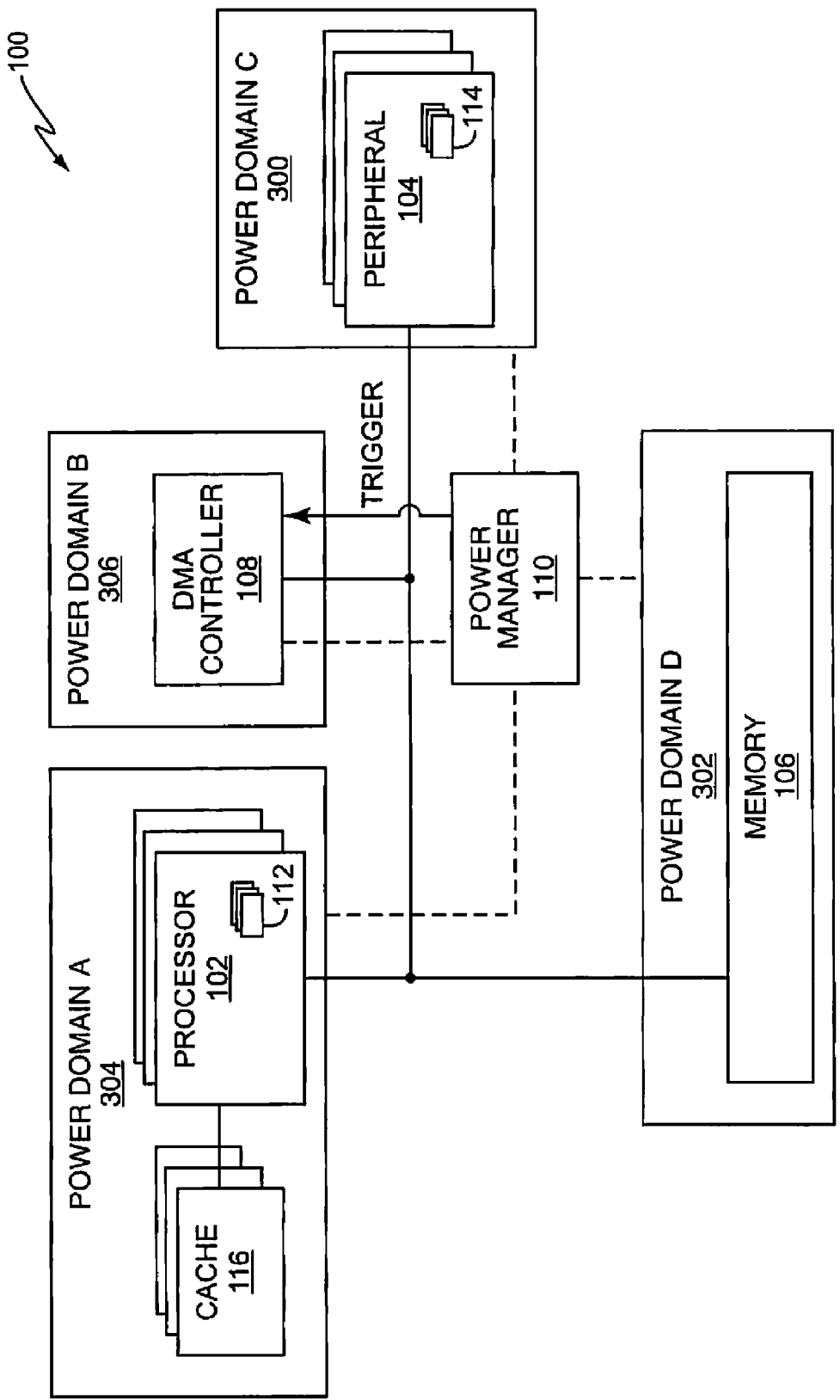
FIG. 3 is a block diagram of yet another embodiment of an integrated circuit including a DMA controller.

FIG. 3 illustrates yet another embodiment of the integrated circuit 100. According to this embodiment, each component, including the DMA controller 108, is located in a different power domain 300-306. This provides more low-power state scenarios. For example, the power domain 300 for the peripheral components 104 can be powered down while the other power domains 302-306 remain fully powered as described above. Alternatively, the memory power domain 302 can remain fully powered while the other components are in a low-power state, and thus the memory 106 can be volatile. If the memory power domain 302 can be powered down, the memory 106 preferably is nonvolatile so that data backups and restores performed by the DMA controller are reliable. In yet another configuration, only the memory power domain 302 remains powered. This allows the power domain 304 including the processor components 102 and caches 116 to be powered down along with the peripheral component power domain 300. The power domain 306, including the DMA controller 108, can also be powered-down after the appropriate data is backed up to further reduce power consumption. The DMA controller 108 is subsequently re-powered if the low-power event subsides so that the data can be restored. Alternatively, the DMA controller power domain 306 can remain powered if desired. Still other low-power state configurations are possible.

Figure 4:
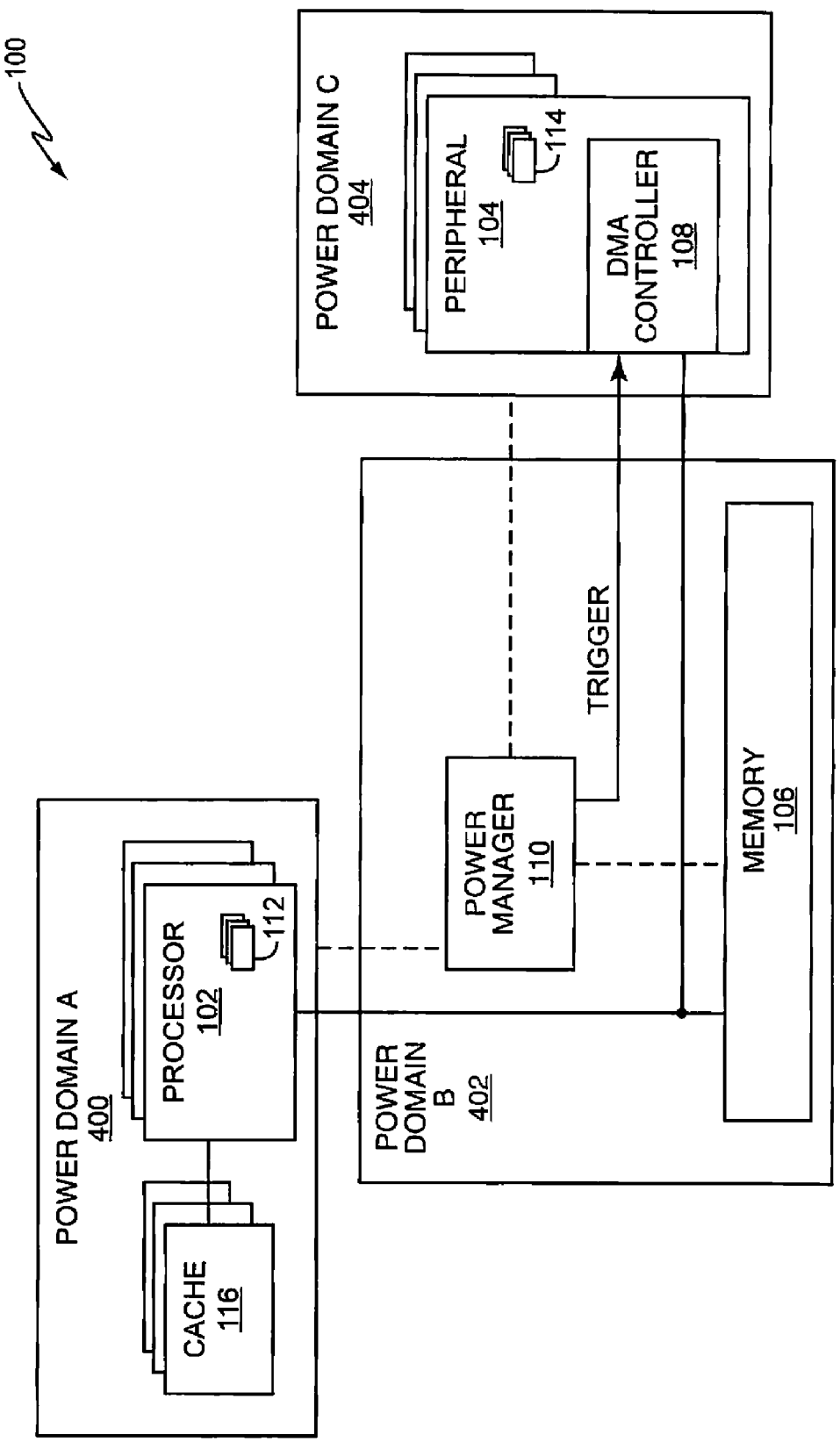
FIG. 4 is a block diagram of still another embodiment of an integrated circuit including a DMA controller.

FIG. 4 illustrates still another embodiment of the integrated circuit 100. According to this embodiment, the DMA controller 108 is embedded as part of the peripheral component 104. The processor and memory components 102, 106 can have different power domains 400, 402 as shown in FIG. 4 or share the same power domain. In either case, the DMA controller 108 performs appropriate backup operations before the operating voltage supplied to peripheral component power domain 404 is reduced or eliminated. The DMA controller 108 subsequently restores the backed up data after the operating voltage supplied to the peripheral power domain 404 is returned to a normal operating level by the power manager 110.

Figure 5:
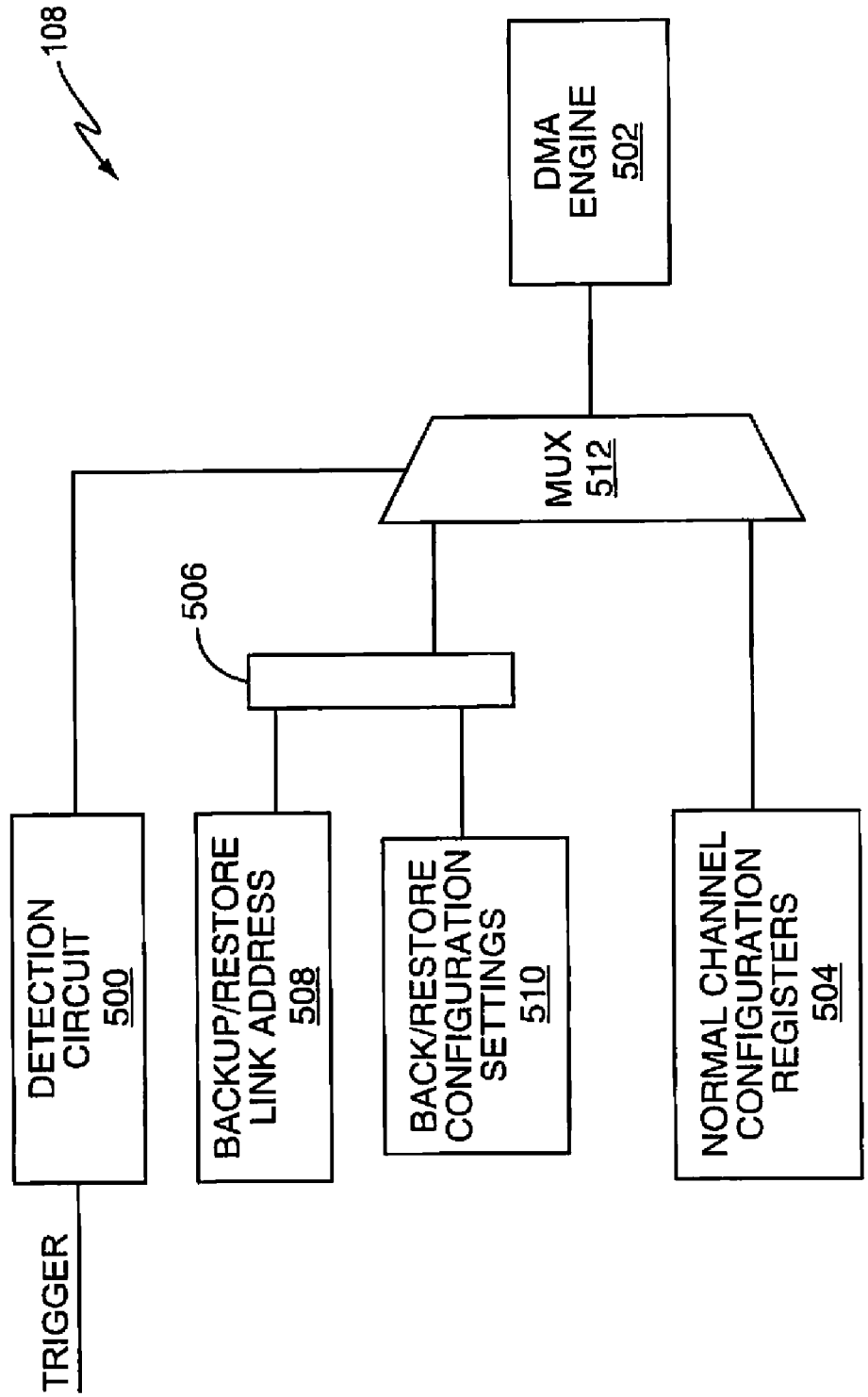
FIG. 5 is a block diagram of an embodiment of a DMA controller.

FIG. 5 illustrates an embodiment of the DMA controller 108. According to this embodiment, the DMA controller 108 includes a detection circuit 500 for monitoring the trigger signal to determine if a change in power state occurs. In one embodiment, the trigger signal is carried over a single line to the DMA controller 108 and the signaling indicates whether a low-power state is being entered or exited. In another embodiment, a power-down trigger signal is carried over a first line for indicating a power-down event and a power-up trigger signal is carried over a different line for indicating a power-up event. Still other signaling schemes are within the embodiments disclosed herein. In each case, the detection circuit 500 monitors the trigger signal to determine whether a data backup or restore should be performed. Otherwise, the DMA controller 108 executes regularly-scheduled DMA transfers.

In more detail, the DMA controller 108 includes a DMA engine 502 for executing DMA transfers. During a normal operating power state, conventional DMA transfers are performed directly between the components 102-104 and/or between the components 102-104 and memory 106. The DMA controller 108 includes registers 504 for storing channel configuration parameters associated with the normal DMA transfers. The configuration parameters determine the channel characteristics, the source and destination, and whether multiple DMA transfers are linked together. The DMA registers 504 can be programmed by a processor component 102 or other component 104.

Figure 6:
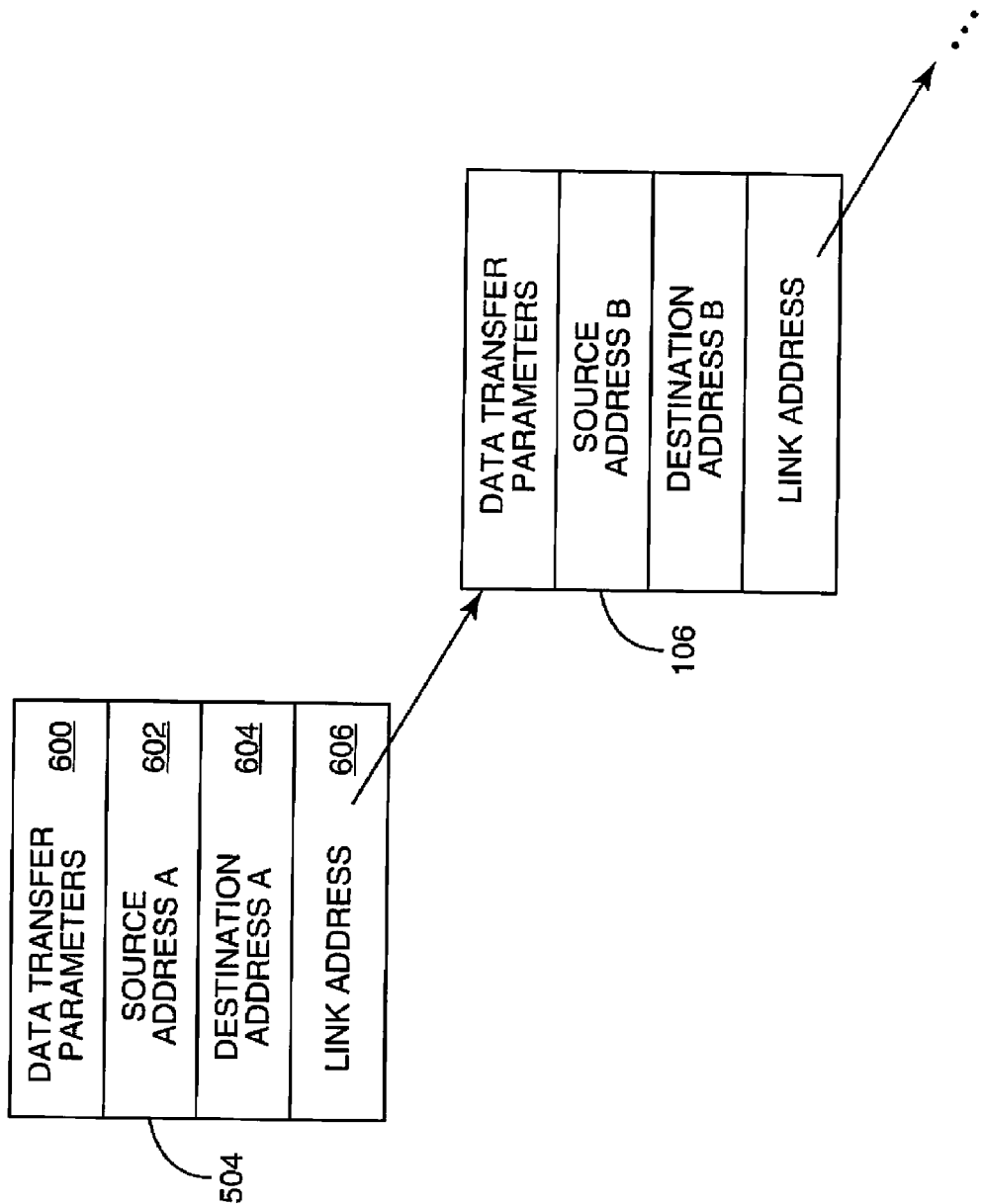
FIG. 6 is a block diagram of an embodiment of a DMA register set.

FIG. 6 illustrates an embodiment of the DMA registers 504 when programmed for a regularly-scheduled DMA transfer. Data transfer parameters are stored in a first register 600. The data transfer parameters determine the channel characteristics and may include parameters such as total transfer size (e.g., in number of bytes), bus size (e.g., in number of bytes) and whether the DMA transfer is locked or unlocked. A locked DMA transfer prevents other components from transferring data until the current DMA transfer is complete. An unlocked DMA transfer allows multiple data transfers to be interleaved together. The source and destination addresses are stored in additional registers 602, 604. A link register 606 stores the address of a location in the memory 106 where another set of configuration parameters is available for the next DMA transfer if multiple DMA transfers are chained together. Otherwise, a NULL value is stored in the link register 606 for indicating to the DMA engine 502 that no other DMA transfers are linked to the current one.

Figure 7:
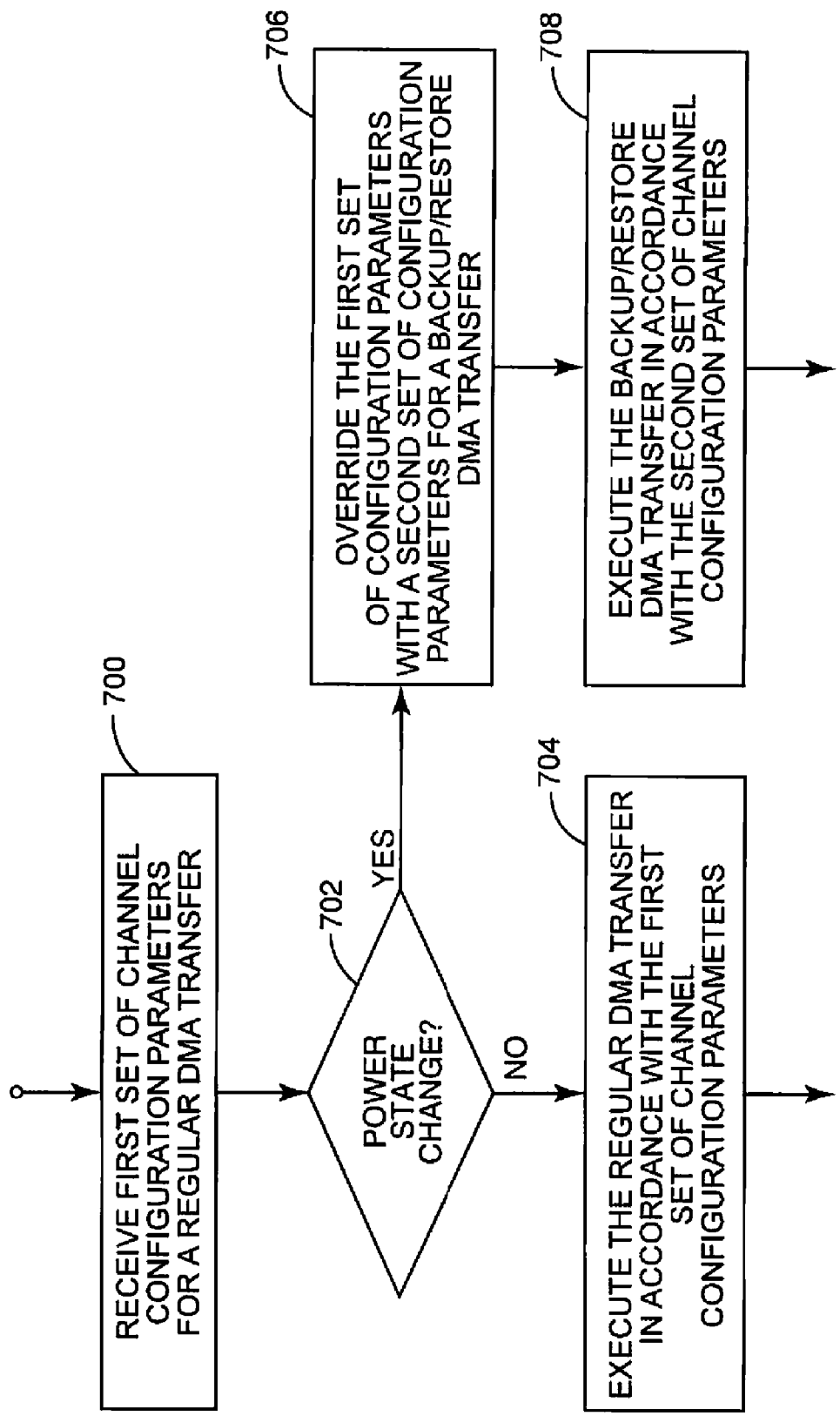
FIG. 7 is a flow diagram of an embodiment of a method for backing-up and restoring data using a DMA controller.

FIG. 7 illustrates an embodiment of a method for executing DMA transfers during normal and low-power operating states. A regular DMA transfer is scheduled by writing a new set of configuration parameters to the DMA registers 504 (Step 700). The detection circuit 500 monitors the trigger signal for changes in the current power state (Step 702). During a normal power operating state, the configuration parameters stored in the DMA registers 504 are provided to the DMA engine 502. The DMA engine 502 executes the regularly-scheduled DMA transfer in accordance with the configuration parameters by transferring data from the identified source to the identified destination (Step 704). The DMA controller 108 retrieves a new set of configuration parameters from the memory location identified by the link register 606 if multiple DMA transfers are chained together and executes the next DMA transfer (repeat Steps 700-704). If there are no chained transfers, or if the last transfer in the chain has been executed, the link register 606 contains a NULL address for indicating to the DMA engine 502 that all transfers are complete. The DMA engine 502 may issue an interrupt indicating completion of the transfer(s).

Figure 8:
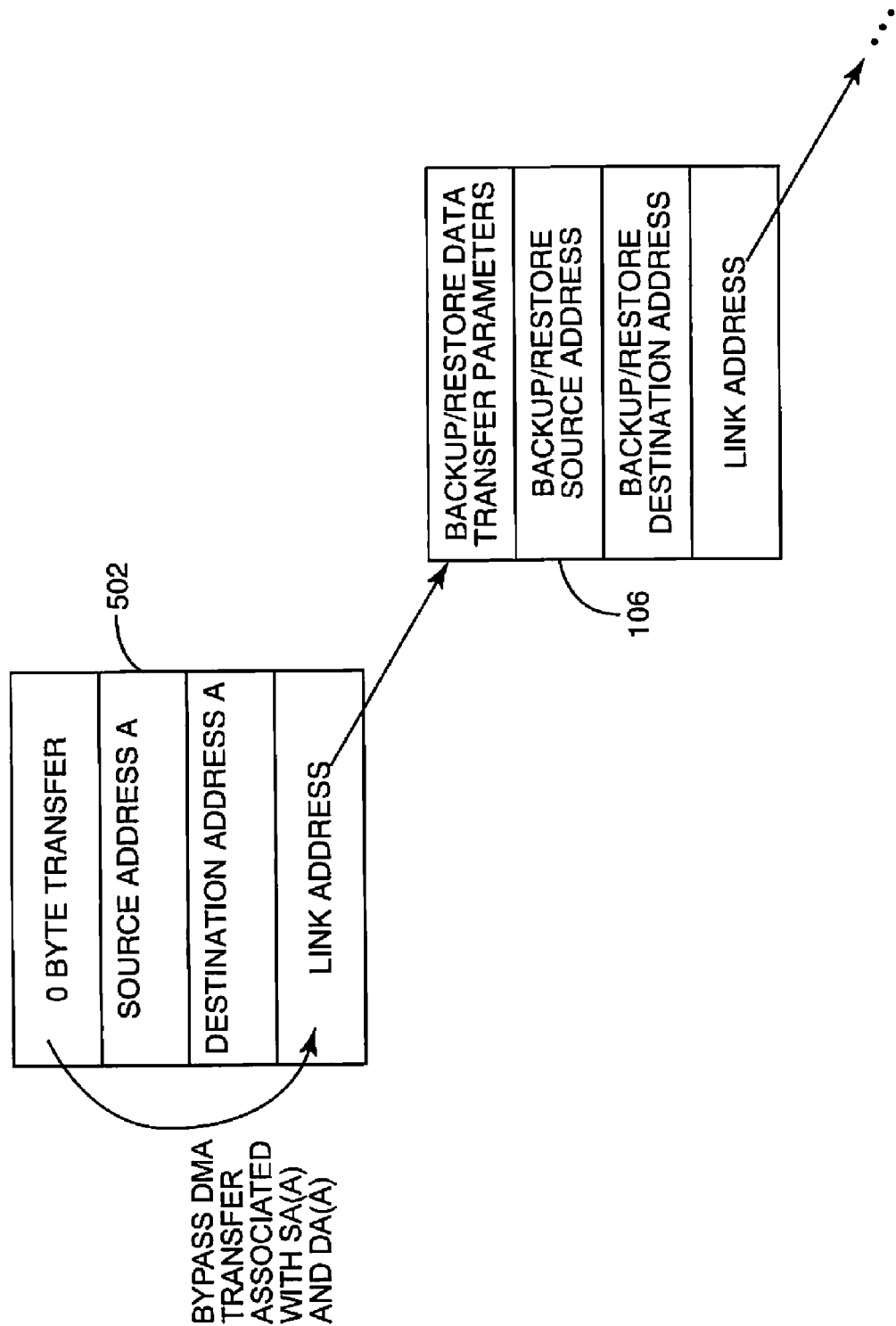
FIG. 8 is a block diagram of an embodiment of configuration settings that override the DMA register set of FIG. 6 during a DMA backup/restore operation.

When the detection circuit 500 detects a change in the current power state, the DMA controller 108 overrides the configuration parameters stored in the DMA registers 504 with a replacement set of configuration parameters (Step 706). In one embodiment, the replacement set of configuration parameters is stored in the memory 106. To access the replacement parameters, a logic circuit 506 appends a backup/restore link address 508 to backup/restore configuration settings 510 both of which may be hard-coded or programmable, e.g., by one of the processor components 102, power manager 110 or other component. Together, this information is provided to the DMA engine 502 by a multiplexer circuit 512, thus overriding the preexisting set of configuration parameters stored in the DMA registers 504. This new information causes the DMA engine 504 to skip the source and destination address fields 602, 604 normally expected in favor of the backup/restore link address 508 and backup/restore configuration settings 510. In one embodiment, the backup/restore configuration settings 510 selected by the multiplexer 512 indicate a 0-byte transfer to the DMA engine 502 as shown in FIG. 8. The DMA engine 502 recognizes the 0-byte transfer, and in response, considers the "present" DMA transfer to be complete. This causes the DMA engine 502 to skip the source and destination address fields 602, 604 and process the backup/restore link address 508 without having first executed a DMA transfer. The DMA engine 502 then retrieves the replacement set of backup/restore configuration parameters from the location in memory 106 indicated by the backup/restore link address 508 and executes either a backup or restore DMA transfer in accordance with the newly retrieved configuration parameters (Step 708).

Particularly, the backup/restore configuration parameters retrieved from the memory 106 identify data transfer parameters that determine the channel characteristics, source and destination addresses and a link address if multiple backup/restore DMA transfers are to be executed. The DMA engine 502 executes a backup operation by transferring data from the source to destination just like a regular DMA transfer, backing-up the data in the memory 106. At the end of the low-power state, the trigger signal indicates power is to be restored. In response, the DMA engine 502 restores the data. In one embodiment, the DMA engine 502 switches the source and destination addresses and performs the same DMA transfer, but in the opposite direction based on the switched addresses. In another embodiment, the DMA controller 108 retrieves a set of restore configuration parameters from the memory 106 as described above. In each case, previously backed-up data is safely and reliably restored under control of the DMA controller 108.

In another embodiment, the backup/restore configuration parameters are stored by the DMA controller 108 instead of in the memory 106, e.g., as hard-coded configuration parameters. This allows the DMA controller 108 to immediately begin executing a backup or restore data transfer without first retrieving the parameters from the memory 106. According to this embodiment, the backup/restore configuration parameters directly identify the channel characteristics, source and destination addresses and link address (for chained DMA transfers) instead of inducing the DMA engine 502 to retrieve the configuration parameters from the memory 106 before performing a backup/restore DMA transfer. The backup/restore configuration parameters can be provided to the DMA controller 108 and stored in advance of a low-power event, e.g., in a second set of DMA registers (not shown). The multiplexer 512 selects between the two different register sets depending on the state of the trigger signal. The DMA engine 502 executes a DMA transfer in accordance with the configuration parameters provided by the multiplexer 512.

Data can be backed-up to the memory 106 or restored from the memory 106 via the DMA controller 108 using scan chains included in the components 102, 104. According to this embodiment, the backup/restore configuration parameters used by the DMA engine 502 during a low-power event identify a port and length of one or more scan chains (not shown). Scan chains are formed by connecting storage elements such as flip-flops into chains. In one embodiment, the scan chains are coupled together, e.g., in a JTAG (Joint Test Action Group) or similar configuration, and thus a single port number and the total length of all chains coupled together are identified. In another embodiment, each scan chain can be separately accessed by the DMA controller 108 by providing a port number and length of each scan chain to be accessed. In yet another embodiment, long scan chains are divided into several smaller segments each having a length up to the word width of the data port of the DMA controller 108. The scan chain segments are aggregated together in parallel so that each bit of the DMA data width corresponds to a unique scan chain. Each scan chain segment can be of equal length or additional circuitry (not shown) can control the operation of each individual segment so that the appropriate number of bits are scanned into each segment. In each case, data received from each scan chain port is written to a location in the memory 106 identified by the backup/restore configuration parameters. The data can be subsequently restored by retrieving the data from the memory 106 and writing the data back to each scan chain port in reverse order from which the data was previously received. In another embodiment, data is backed-up in response to a low-power event by writing register data received from the one or more components 102, 104 to a location in the memory 106 identified by the backup/restore configuration parameters. The data can be subsequently restored by reversing the source and destination addresses or by providing a new set of restore configuration parameters, both as previously described herein.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of operating a direct memory access DMA controller, comprising:

overriding a first set of configuration parameters with a second set of configuration parameters upon the DMA controller detecting a power state change, the first set of configuration parameters corresponding to a first DMA transfer and the second set of configuration parameters corresponding to a second DMA transfer;

executing the first DMA transfer in accordance with the first set of configuration parameters if no change in power state is detected; and executing the second DMA transfer in accordance with the second set of configuration parameters if a change in power state is detected, wherein overriding the first set of configuration parameters with the second set of configuration parameters further comprises overriding the first set of configuration parameters with information that indicates a zero-byte transfer; and retrieving the second set of configuration parameters from a memory location identified by the information responsive to the DMA controller recognizing the zero-byte transfer.

2. The method of claim 1, wherein retrieving the second set of configuration parameters from the memory location identified by the information comprises retrieving the second set of configuration parameters from the memory location identified by a link address provided to the DMA controller.

3. The method of claim 1, wherein executing the second DMA transfer in accordance with the second set of configuration parameters if a change in power state is detected comprises:

transferring data from a component identified by a source address retrieved from the memory location to a region in memory identified by a destination address retrieved from the memory location if the power state changes from a first state to a second state; and restoring the data from the memory region to the component if the power state changes back to the first state.

4. The method of claim 3, wherein restoring the data from the memory region to the component if the power state changes back to the first state comprises:

switching the source and destination addresses; and executing a DMA transfer based on the switched addresses.

5. A method of operating a direct memory access DMA controller, comprising:

overriding a first set of configuration parameters with a second set of configuration parameters upon the DMA controller detecting a power state change, the first set of configuration parameters corresponding to a first DMA transfer and the second set of configuration parameters corresponding to a second DMA transfer;

executing the first DMA transfer in accordance with the first set of configuration parameters if no change in power state is detected; and executing the second DMA transfer in accordance with the second set of configuration parameters if a change in power state is detected, wherein executing the second DMA transfer in accordance with the second set of configuration parameters if a change in power state is detected further comprises transferring data from one or more components to memory via the DMA controller if the power state changes from a first state to a second state; and restoring the data from the memory to the one or more components via the DMA controller if the power state changes back to the first state, and further wherein transferring data from the one or more components to the memory via the DMA controller comprises:

identifying a port and length of at least one scan chain included in the one or more components based on the second set of configuration parameters; and writing data received from each scan chain port to the memory.

6. The method of claim 5, wherein restoring the data from the memory to the one or more components via the DMA controller comprises:

retrieving the data from the memory; and writing the data to each scan chain port in reverse order from which the data was previously received.

7. The method of claim 5, comprising;

dividing the at least one scan chain into a plurality of smaller scan chain segments each having a length up to a word width of a data port of the DMA controller; and aggregating the scan chain segments together in parallel so that each bit of the word width corresponds to a different one of the scan chain segments.

8. An integrated circuit comprising a direct memory access (DMA) controller comprising:

a DMA engine configured to execute DMA transfers based on configuration meters provided to the DMA engine;

a detection circuit configured to detect a power state change; and circuitry configured to provide a first set of configuration parameters to the DMA engine if no change in power state is detected and to override the first set of configuration parameters with a second set of configuration parameters if a change in power state is detected, the first set of configuration parameters corresponding to a first DMA transfer and the second set of configuration parameters corresponding to a second DMA transfer, wherein the circuitry is configured to override the first set of configuration parameters with information that indicates a zero-byte transfer and the DMA engine is configured to retrieve the second set of configuration parameters from a memory location identified by the information responsive to the DMA engine recognizing the zero-byte transfer.

9. The integrated circuit of claim 8, wherein the DMA engine is configured to retrieve the second set of configuration parameters from the memory location identified by a link address input to the DMA engine.

10. The integrated circuit of claim 8, wherein the DMA engine is configured to transfer data from a component identified by a source address retrieved from the memory location to a memory region identified by a destination address retrieved from the memory location if the power state changes from a first state to a second state and to restore the data from the memory region to the component if the power state changes back to the first state.

11. The integrated circuit of claim 10, wherein the circuitry is configured to switch the source and destination addresses if the power state changes back to the first state and the DMA engine is configured to execute a DMA transfer based on the switched addresses.

12. An integrated circuit comprising a direct memory access (DMA) controller comprising:
a DMA engine configured to execute DMA transfers based on configuration parameters provided to the DMA engine;
a detection circuit configured to detect a power state change; and
circuitry configured to provide a first set of configuration parameters to the DMA engine if no change in power state is detected and to override the first set of configuration parameters with a second set of configuration parameters if a change in power state is detected, the first set of configuration parameters corresponding to a first DMA transfer and the second set of configuration parameters corresponding to a second DMA transfer, wherein the DMA engine is configured to transfer data from one or more components to memory if the power state changes from a first state to a second state and to restore the data from the memory to the one or more components if the power state changes back to the first state and further wherein the DMA engine is configured to identify a port and length of at least one scan chain included in the one or more components based on the second set of configuration parameters and write data received from each scan chain port to the memory if the power state changes from the first state to the second state.

13. The integrated circuit of claim 12, wherein the DMA engine is configured to retrieve the data from the memory and write the data back to each scan chain port in reverse order from which the data was previously received if the power state changes back to the first state.

14. The integrated circuit of claim 12, wherein the at least one scan chain is divided into a plurality of smaller scan chain segments each having a length up to a word width of a data port of the DMA controller and wherein the scan chain segments are aggregated together in parallel so that each bit of the word width corresponds to a different one of the scan chain segments.

* * * * *

UNITED STATES PATENT AND TRADEMARK OFFICE
CERTIFICATE OF CORRECTION

| | | |
|---|---|---|
| PATENT NO. | : 7,895,466 B2 | Page 1 of 1 |
| APPLICATION NO. | : 12/202963 | |
| DATED | : February 22, 2011 | |
| INVENTOR(S) | : Barrow | |

It is certified that error appears in the above-identified patent and that said Letters Patent is hereby corrected as shown below:

In Fig. 5, Sheet 5 of 8, in Box "510", in Line 1, delete "BACK/RESTORE" and insert -- BACKUP/RESTORE --, therefor.

In Column 7, Line 35, in Claim 1, delete "DMA" and insert -- (DMA) --, therefor.

In Column 8, Line 12, in Claim 5, delete "DMA" and insert -- (DMA) --, therefor.

In Column 8, Line 48, in Claim 7, delete "comprising;" and insert -- comprising: --, therefor.

In Column 8, Line 58, in Claim 8, delete "meters" and insert -- parameters --, therefor.

Signed and Sealed this
Seventeenth Day of May, 2011

David J. Kappos
*Director of the United States Patent and Trademark Office*